(12) United States Patent
Jacobsen et al.

(10) Patent No.: US 11,287,824 B2
(45) Date of Patent: Mar. 29, 2022

(54) DETECTING A LOCATION OF AN AUTONOMOUS DEVICE

(71) Applicant: Mobile Industrial Robots A/S, Odense (DK)

(72) Inventors: Niels Jul Jacobsen, Odense (DK); Søren Eriksen Nielsen, Sønderborg (DK)

(73) Assignee: MOBILE INDUSTRIAL ROBOTS A/S, Odense (DK)

( * ) Notice: Subject to any disclaimer, the term of this patent is extended or adjusted under 35 U.S.C. 154(b) by 272 days.

(21) Appl. No.: 16/195,493

(22) Filed: Nov. 19, 2018

(65) Prior Publication Data
US 2020/0159238 A1 May 21, 2020

(51) Int. Cl.
*G05D 1/02* (2020.01)
*G01S 17/931* (2020.01)
(Continued)

(52) U.S. Cl.
CPC .......... *G05D 1/0231* (2013.01); *G01C 22/00* (2013.01); *G01S 17/931* (2020.01); *G01S 17/48* (2013.01);
(Continued)

(58) Field of Classification Search
CPC ......... G01C 22/00; G01S 17/00; G01S 17/48; G01S 17/86; G01S 17/931; G05D 1/0231; G05D 2201/0216; G05D 1/024; G05D 1/0246; G05D 1/0272; G05D 1/0274; G05D 1/028
See application file for complete search history.

(56) References Cited

U.S. PATENT DOCUMENTS 7,196,487 B2   3/2007 Jones et al.
9,110,470 B2   8/2015 Karlsson et al.
(Continued)

FOREIGN PATENT DOCUMENTS

CA       2416382 C       2/2006
WO   WO-2016/057140    4/2016

OTHER PUBLICATIONS

Borenstein, J. et al., Mobile Robots Positioning: Sensors and Techniques, Journal of Robotic Systems, 14(4): 231-249 (1997).
(Continued)

*Primary Examiner* — Hunter B Lonsberry
*Assistant Examiner* — Daniel L Greene
(74) *Attorney, Agent, or Firm* — Burns & Levinson LLP

(57) ABSTRACT

An example autonomous device is configured to move within a space. The autonomous device includes a first system to detect a first location of the autonomous device within the space, with the first location being based on a first fixed reference; a second system to detect a second location of the autonomous device within the space, with the second location being based on a second fixed reference; and a third system to detect a third location of the autonomous device within the space based on relative movements of the autonomous device. One or more processing devices are configured to select one of the first location or the second location based on reliability of at least one of the first location or the second location, and to control movement of the autonomous device using an estimated location that is based on the third location and the selected one of the first location or the second location.

25 Claims, 5 Drawing Sheets

(51) Int. Cl.
  *G01C 22/00* (2006.01)
  *G01S 17/86* (2020.01)
  *G01S 17/48* (2006.01)
(52) U.S. Cl.
  CPC ...... *G01S 17/86* (2020.01); *G05D 2201/0216* (2013.01)

(56) References Cited

U.S. PATENT DOCUMENTS

| | | | |
|---|---|---|---|
| 9,402,151 | B2 | 7/2016 | Song et al. |
| 9,415,310 | B2 | 8/2016 | Martini |
| 9,440,354 | B2 | 9/2016 | Gutmann et al. |
| 9,602,974 | B2* | 3/2017 | Rudow ............... G01S 19/09 |
| 9,910,158 | B2* | 3/2018 | Rudow ............... G01S 19/04 |
| 10,028,632 | B2 | 7/2018 | Britain et al. |
| 2004/0158354 | A1 | 8/2004 | Lee et al. |
| 2005/0182518 | A1* | 8/2005 | Karlsson ............. G05D 1/0272 700/253 |
| 2007/0027612 | A1* | 2/2007 | Barfoot ............... G05D 1/024 701/117 |
| 2007/0222674 | A1* | 9/2007 | Tan ..................... G06Q 10/08 342/357.32 |
| 2009/0313370 | A1* | 12/2009 | Rhoads ................ G01S 5/26 709/224 |
| 2012/0121161 | A1* | 5/2012 | Eade ................... G05D 1/0253 382/153 |
| 2013/0029686 | A1* | 1/2013 | Moshfeghi ........... H04W 4/02 455/456.1 |
| 2013/0297195 | A1* | 11/2013 | Das ..................... G08G 1/163 701/117 |
| 2014/0129027 | A1* | 5/2014 | Schnittman ......... G05D 1/0227 700/253 |
| 2015/0133173 | A1* | 5/2015 | Edge .................... G01S 1/66 455/456.6 |
| 2016/0349362 | A1* | 12/2016 | Rohr ................... G01S 5/0263 |
| 2016/0353238 | A1* | 12/2016 | Gherardi .............. G05D 1/102 |
| 2017/0147003 | A1* | 5/2017 | Karlsson .............. G06T 7/55 |
| 2017/0276501 | A1 | 9/2017 | Wise et al. |
| 2018/0113200 | A1* | 4/2018 | Steinberg ............. G01S 17/93 |
| 2018/0253107 | A1* | 9/2018 | Heinla ................. G05D 1/0212 |

OTHER PUBLICATIONS

Goel, P. et al., Robot Localization Using Relative and Absolute Position Estimates, In Proc. Int. Conf. Intelligent Robots and Systems, IROS '99, 7 pages (1999).
Mobile Industrial Robots, MiRFIeet, Reference Guide, v.1.0, 32 pages (Jan. 2017).
Paya, L. et al., A State-of-the-Art Review on Mapping and Localization of Mobile Robots Using Omnidirectional Vision Sensors, Journal of Sensors, vol. 2017, Article ID 3497650, 20 pages (Published Apr. 24, 2017). URL: https://www.hindawi.com/journals/js/2017/3497650/ [Retrieved Nov. 19, 2018].
Jan Rohde. "Vehicle localization with enhanced robustness for urban automated driving". Jan. 18, 2018, pp. 1-177. Karlsruhe, Germany. DOI: 10.5445/IR/1000080454. Retrieved from the Internet: URL:http://dx.doi.org/10.5445/IR/1000080454.
Invitation to Pay Additional Fees for PCT/EP2019/081349, 14 pages (dated Feb. 21, 2020).
International Search Report for PCT/EP2019/081349, 7 pages (dated Jul. 2, 2020).
Written Opinion for PCT/EP2019/081349, 13 pages (dated Jul. 2, 2020).
Johann Borenstein et al.: "Where am I? Sensors and Methods for Mobile Robot Positioning", Apr. 22, 1996 (Apr. 22, 1996), pp. 1-182, XP055600238, Retrieved from the Internet: URL:http://wwwpersonal.umich.eduhjohannb/Papers/pos96rep.pdf [retrieved on Jun. 27, 2019].
Stella E et al.: "Mobile robot navigation using vision and odometry", Proceedings of the Intelligent Vehicles Symposium, XX, Oct. 24, 1994 (Oct. 24, 1994), pp. 417-422, XP002697677, DOI: 10.1109/IVS.1994.639554.
MIR 500 User Guide. Mobile Industrial Robots A/S. Odense, SØ. (Sep. 2019). V. 1.3, (pp. 1-100). 100 pages .
MIR 100 User Guide. Mobile Industrial Robots A/S. Odense, SØ. (Aug. 2018). V. 1.1, (pp. 1-42). 44 pages.
MIR 100 User Guide. Mobile industrial Robots A/S. Odense, SØ. (Nov. 2017). V. 1.0, (pp. 1-37). 39 pages.
International Preliminary Report on Patentability for PCT Application No. PCT/EP2019/081349, dated Jun. 3, 2021, (12 pages).

* cited by examiner

DETECTING A LOCATION OF AN AUTONOMOUS DEVICE

TECHNICAL FIELD

This specification relates generally to an autonomous device configured to perform localization.

BACKGROUND

Autonomous devices, such as mobile robots, are configured to travel within a space, such as a warehouse, independently. For example, an autonomous device may determine its location within the space and use that location to control its future movements. This all may be done with little or no user input. The process that an autonomous device uses to detect its location is sometimes called localization.

A mobile robot may perform localization using visual inputs or odometry data. Visual inputs may be unreliable in dynamic environments or in cases where features on which those inputs are based are not discernable. An odometry-based localization system determines the distance and direction of travel of a robot since an immediately prior localization. Because odometry-based localization systems are incremental—that is, they rely on the accuracy of a prior localization—they can be inaccurate. Location errors can be compounded with each subsequent localization.

SUMMARY

An example autonomous device is configured to move within a space. The autonomous device includes a first system to detect a first location of the autonomous device within the space, with the first location being based on a first fixed reference; a second system to detect a second location of the autonomous device within the space, with the second location being based on a second fixed reference; and a third system to detect a third location of the autonomous device within the space based on relative movements of the autonomous device. One or more processing devices are configured to select one of the first location or the second location based on reliability of at least one of the first location or the second location, and to control movement of the autonomous device using an estimated location that is based on the third location and the selected one of the first location or the second location. The autonomous device may include one or more of the following features, either alone or in combination.

The one or more processing devices may be configured to determine the reliability of at least one of the first location or the second location by setting mathematical limits of a particle filter. The one or more processing devices may be configured to determine if visualization data upon which the first location is based exceeds the mathematical limits of the particle filter. The one or more processing devices may be configured to determine the reliability of at least one of the first location or the second location by comparing the first location and the second location to the third location.

The first system may include a vision system configured to detect landmarks within the space that are within a predefined distance of the robot. The landmarks include the first fixed reference. The first system may include a laser-based vision system. The first system may include a light detection and ranging (LIDAR) system.

The second system may be configured to determine the second location through triangulation. The triangulation may be based on the second fixed reference. The second system may include a transmitter for transmitting signals and a receiver for receiving timestamp messages based on the signals. The one or more processing may be are configured to determine the second location based on a transmitted signal and a timestamp message corresponding to the transmitted signal. The timestamp message may contain a time that the transmitted signal was received by a remote receiver. The second fixed reference may include the remote receiver.

The second system may include a receiver for receiving signals and timestamp messages based on the signals. The one or more processing devices may be configured to determine the second location based on a received signal and a timestamp message corresponding to the received signal. The timestamp message may contain a time that the received signal was transmitted by a remote transmitter. The second fixed reference may include the remote transmitter.

The second system may include a transmitter for transmitting signals and a receiver for receiving timestamp messages and signals. The one or more processing devices may be configured to determine the second location based on a transmitted signal and a timestamp message corresponding to the transmitted signal. The timestamp message may contain a time that the transmitted signal was received by a remote receiver. The second fixed reference may include the remote receiver. The one or more processing devices may be configured to determine the second location based also on a received signal and a timestamp message corresponding to the received signal. The timestamp message may contain a time that the received signal was transmitted by the remote receiver.

The autonomous device may include a body and wheels to move the body. The third system may include an odometry system. The odometry system may be configured to determine the third location based on movements of the wheels. The relative movements of the autonomous device may be based on the movements of the wheels. The odometry system may include encoders connected to the wheels. The encoders may provide information about rotation of the wheels. The information about rotation of the wheels may include degrees of rotation of the wheels.

The one or more processing devices may be configured to obtain the estimated location by averaging the second location and the third location. The one or more processing devices may be configured to obtain the estimated location by obtaining a weighted average of the second location and the third location The one or more processing devices may be configured to obtain the estimated location based on one or more prior estimated locations of the autonomous device. The one or more processing devices may be configured to control movement of the autonomous device using the estimated location and not the first location in a case that the estimated location is more reliable than the first location The one or more processing devices may be configured to perform operations that include determining a level of reliability of the first location and comparing the determined level of reliability to a predefined level of reliability to identify that first location has less than the predefined level of reliability. Determining the level of reliability of the first location may include using a filter to compare visual data based on the first fixed reference to known features in a database.

The estimated location of the autonomous device may be obtained by processing the second location and the third location using a finite impulse response filter. The one or more processing devices may be configured to determine a reliability of the first location using a particle filter and to compare the reliability to the predefined level of reliability. The estimated location of the autonomous device may be obtained by processing the second location and the third location using a Kalman filter or a particle filter. The one or more processing devices may be configured to determine the estimated location of the autonomous device based on both of the second location and the third location An example autonomous device is configured to move within a space. The autonomous device includes a first system to detect a first location of the autonomous device within the space, with the first location being based on a first fixed reference; a second system to detect a second location of the autonomous device within the space, with the second location being based on a second fixed reference; and a third system to detect a third location of the autonomous device within the space based on relative movements of the autonomous device. One or more processing devices are configured to determine an estimated location of the autonomous device within the space based on at least one of the second location or the third location, to determine a reliability of the first location, and to control movement of the autonomous device using the estimated location in a case that the estimated location is more reliable than the first location. The one or more processing devices may be configured to determine the estimated location of the autonomous device based on both of the second location and the third location An example autonomous device is configured to move within a space. The autonomous device includes a first system to detect a first location of the autonomous device within the space, with the first location being based on a first fixed reference; and a second system to detect a second location of the autonomous device within the space, with the second location being based on a second fixed reference. One or more processing devices are configured to calibrate the second system based on the first location, to determine a reliability of the first location, and to control movement of the autonomous device using the second location in a case that the first location has less than a predefined level of reliability. The autonomous device may include a third system to detect a third location of the autonomous device within the space based on relative movements of the autonomous device.

Any two or more of the features described in this specification, including in this summary section, can be combined to form implementations not specifically described herein.

The systems and processes described herein, or portions thereof, can be controlled by a computer program product that includes instructions that are stored on one or more non-transitory machine-readable storage media, and that are executable on one or more processing devices to control (e.g., coordinate) the operations described herein. The systems and processes described herein, or portions thereof, can be implemented as an apparatus or method. The systems and processes described herein can include one or more processing devices and memory to store executable instructions to implement various operations.

The details of one or more implementations are set forth in the accompanying drawings and the description below. Other features and advantages will be apparent from the description and drawings, and from the claims.

DETAILED DESCRIPTION

Figure 1:
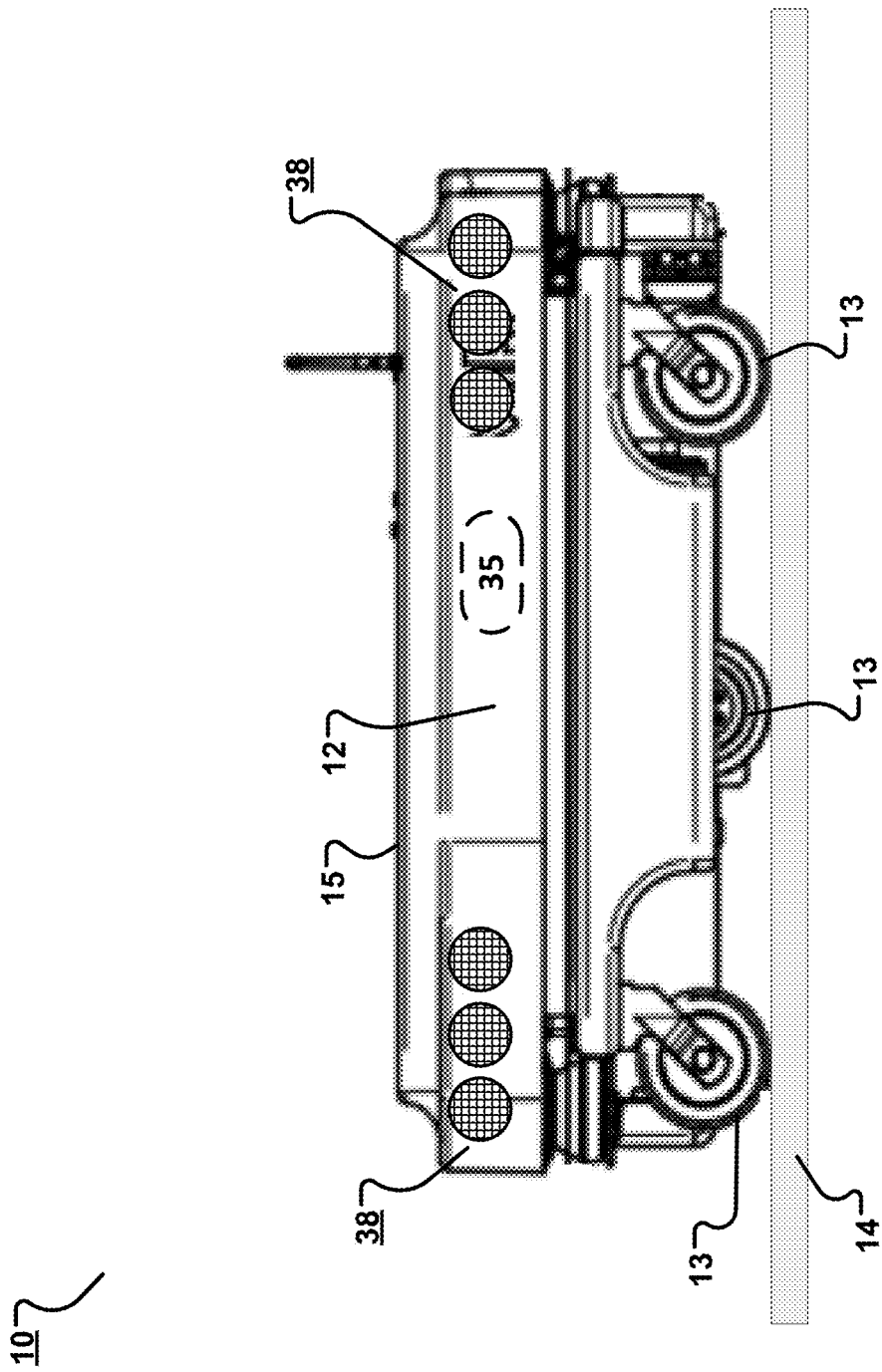
FIG. 1 is a side view of an example autonomous robot.

Described herein are examples of autonomous devices or vehicles, such as a mobile robot, that are configured to move within a space, such as a warehouse or factory. An example autonomous device (or "device") is configured to move along a surface, such as the floor of a warehouse. The device includes a body for supporting the weight of an object and wheels on the body to enable the body to traverse the surface. The example device includes long-range sensors on the body configured for detecting objects in a long-range field of view (FOV) or simply "field". In an example, a long-range FOV includes, but is not limited to, a FOV of 12 meters (M) to 30 M. The device includes multiple localization systems. An example localization system is configured—for example, constructed, arranged, and/or programmed—to detect a location of the autonomous device within the space. In some implementations, the device includes a first localization system to detect a first location of the autonomous device based on a first fixed reference within the space, a second localization system to detect a second location of the autonomous device based on a second fixed reference within the space, and a third localization system to detect a third location of the autonomous device based on relative movements of the autonomous device.

In some implementations, the first localization system includes a vision system, such as a laser scanner, a camera, or both a laser scanner and a camera. The vision system is configured—for example, constructed, arranged, and/or programmed—to detect landmarks within the space that are at known locations within the space. The landmarks include the first fixed reference, among other things. A first location of the autonomous device is detected based on the autonomous device's location relative to one or more of these landmarks. In some implementations, the second localization system includes a triangulation system. The triangulation system may include, for example, a transmitter that may be located on the autonomous device or remote from the autonomous device, and a receiver that may be located on the autonomous device or remote from the autonomous device. A second location of the autonomous device is detected based on transmitted and/or received signals and timings thereof. In some implementations, the third localization system is a relative positioning system. For example, the third localization system may include an odometry system. The odometry system may be configured—for example, constructed, arranged, and/or programmed—to determine the third location based in part on rotation of the device's wheels. For example, relative movements of the autonomous device may be based on the rotation of the wheels that causes the autonomous device to move. The third location of the autonomous device is detected based also on known past locations of the autonomous device within the space. For example, the incremental amount of movement of the device since the last known location is combined with—for example, added to—the last known location to obtain a current location of the device. The third location of the autonomous device can be determined based on input from an inertial measurement unit (IMU) that provides data based on acceleration of the autonomous device, gyroscopic data, and angular acceleration of the autonomous device.

The autonomous device also includes a control system. The control system may include of one or more processing devices, such as one or more microprocessors, that are configured—for example, programmed—to determine a reliability of the first location and, based on the reliability of the first location, to control movement of the autonomous device using either the first location or an estimated location that is based on the second location, the third location, or both the second location and the third location. For example, the estimated location may include some type of average or combination of the second location and the third location. In some examples, the control system controls movement of the autonomous device using the estimated location if the first location does not have at least a predefined level of reliability. In some examples, the control system controls movement of the autonomous device using the estimated location if the estimated location is more reliable than the first location. In some examples, the first location is often most accurate and is the primary means of detecting the autonomous device's location. In some examples, if the estimated location is used then the first location is not used and vice versa.

An example of an autonomous device is autonomous robot 10 of FIG. 1. In this example, autonomous robot 10 is a mobile robot and is referred to simply as "robot". Robot 10 includes a body 12 having wheels 13 to enable robot 10 to travel across a surface 14, such as the floor of a warehouse, a factory, or other terrain. Robot 10 includes a support area 15 configured to support the weight of an object. In this example, robot 10 may be controlled to transport the object from one location to another location. Robot 10 includes various sensors for use in detecting the robot's location.

In this example, robot 10 includes two types of long-range sensors: a three-dimensional (3D) camera and a light detection and ranging (LIDAR) scanner. However, the robot is not limited to this configuration or these sensors. For example, the robot may include a single long-range sensor or a single type of long-range sensor. For example, the robot may include more than two types of long-range sensors.

Figure 2:
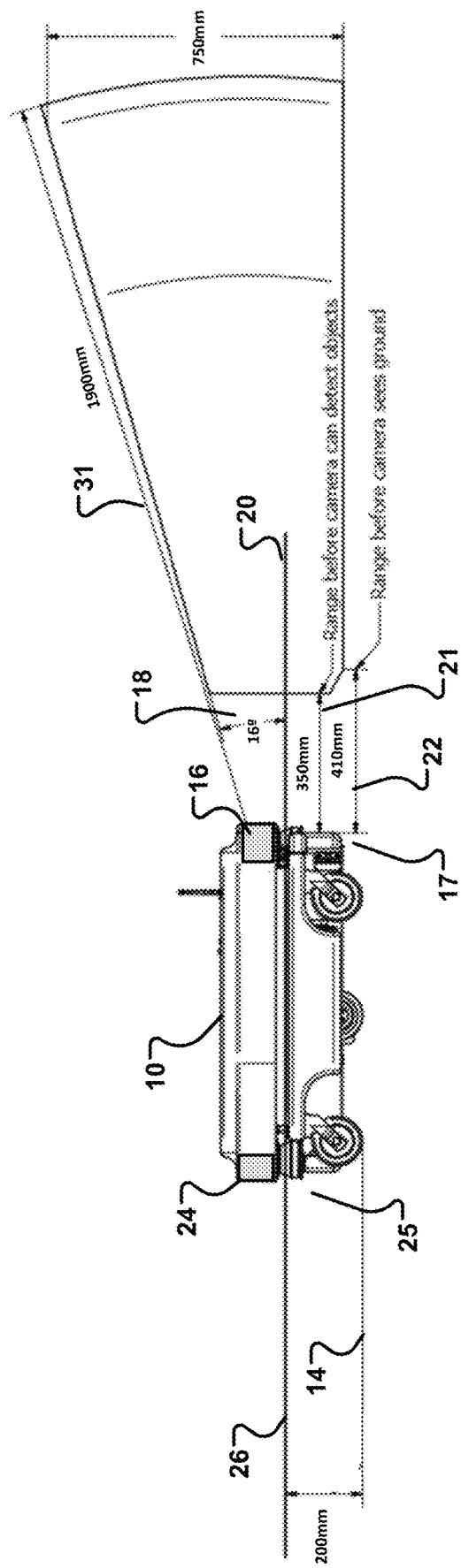
FIG. 2 is a side view of the example autonomous robot, which shows ranges of long-range sensors included on the robot.

Referring to FIG. 2, robot 10 includes 3D camera 16 at a front 17 of the robot. In this example, the front of the robot faces the direction of travel of the robot. The back of the robot faces terrain that the robot has already traversed. In this example, 3D camera 16 has a FOV 18 of 16° off of horizontal plane 20. The placement of 3D camera 16 is such that there is about a 350 millimeter (mm) range 21 before the 3D camera can detect an object proximate to the robot, and about a 410 mm range 22 before the object can detect the surface 14 on which it is traveling. In this example, the 3D camera has a sensing range 31 of about 1900 mm and can see about 750 mm above surface 14. Robot 10 also includes a LIDAR scanner 24 at its back 25. In this example, the LIDAR scanner is positioned at a back corner of the robot. The LIDAR scanner is configured to detect objects within a sensing plane 26. In this example, the sensing plane is about 200 mm above surface 14. The LIDAR scanner is not capable of detecting objects less than 200 mm above surface 14. A similar LIDAR scanner is included at the diagonally opposite front corner of the robot, which has the same scanning range and limitations.

Figure 3:
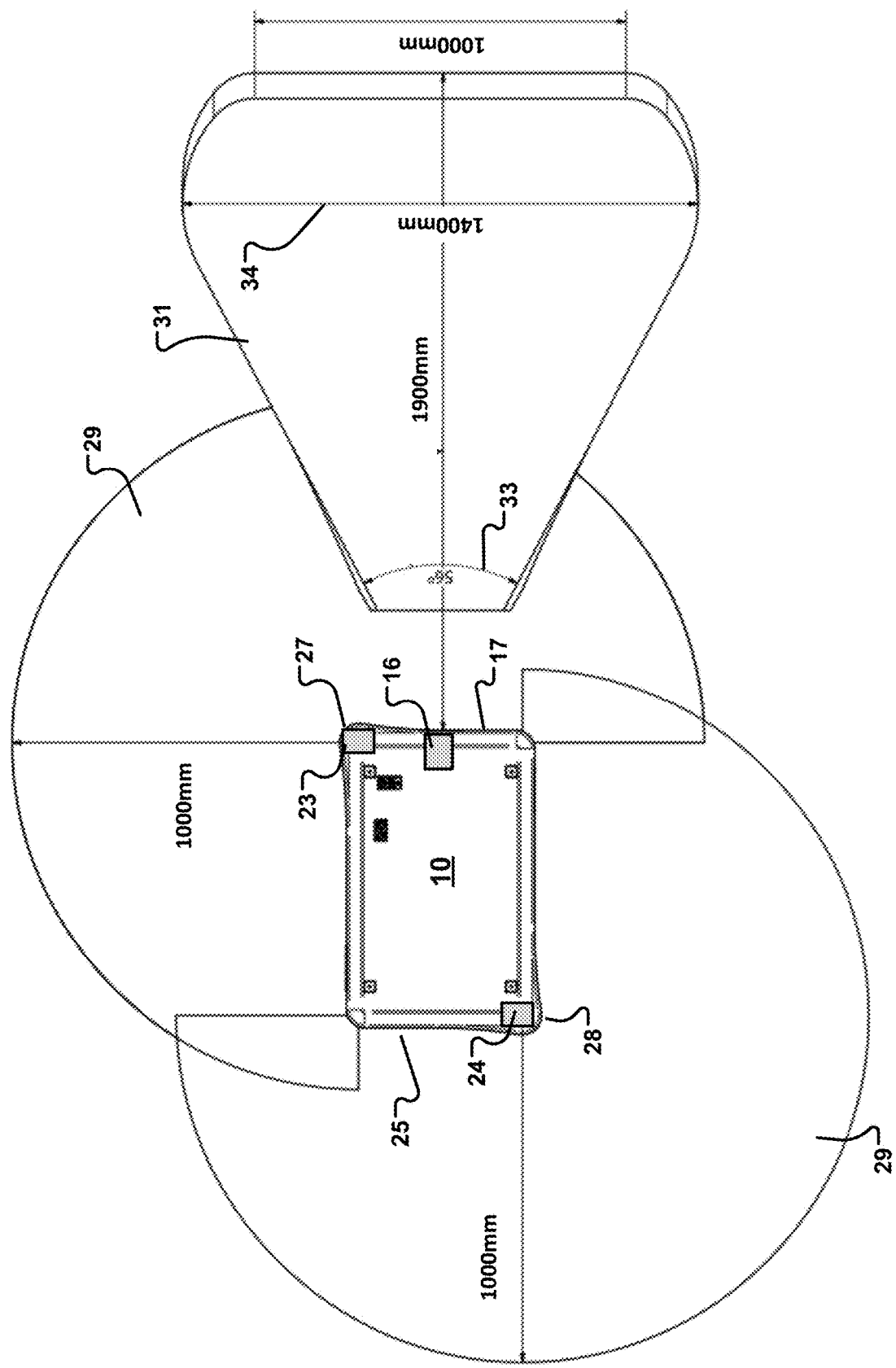
FIG. 3 is a top view of the example autonomous robot, which shows ranges of the long-range sensors included on the robot.

FIG. 3 is a top view of robot 10. LIDAR scanners 24 and 23 are located at back corner 28 and at front corner 27, respectively. In this example, each LIDAR scanner has a scanning range 29 of about 1000 mm over an arc of about 270°. In some implementations, each LIDAR scanner may have a scanning range of about 12,000 mm over an arc of about 270°. In this example, a range 31 of 3D camera 16 is about 1900 mm over an arc 33 of about 56°. However, after a plane 34, the field of view of 3D camera 16 decreases from about 1400 mm to about 1100 mm at the maximum range of the 3D camera. In some implementations, short-range sensors are incorporated into the robot to sense in the areas that cannot be sensed by the long-range sensors. The short-range sensors 38 (FIG. 1) may be arranged at corners of the robot or around a circumference of the robot. Examples of short-range sensors include, but are not limited to, time-of-flight (ToF) laser-ranging modules, an example of which is the VL53L0X manufactured by STMicroelectronics®, and infrared sensors.

The LIDAR scanner, the 3D camera, and/or any short-range sensors constitute a vision system for the robot. Visual data obtained by the vision system may be used to determine a location of the robot within a space being traversed. In this regard, in some implementations, the control system 35 stores a map of the space in computer memory. Control system 35 is shown in dashed lines in FIG. 1 because the part of it on the robot is internal. The map may be located on the robot or at any location that is accessible to the control system. The map includes locations of landmarks, such as columns, corners, windows, poles, and other distinguishable features of the space that act as references for the robot. The map also may also include measurements indicating the size of the space, measurements indicating the size and locations of the landmarks, measurements indicating distances between landmarks, and coordinate information identifying where the landmarks are located in the space. The control system uses visual data from the vision system and data from the map to determine a location of the robot within the space. For example, the robot may identify the locations of three landmarks within the space. By knowing where the robot is relative to these landmarks, the locations of the landmarks within the space, and the distances between the landmarks, the control system can determine the location of the robot within the space.

Robot 10 also includes an odometry system. In some implementations, one or more wheels—for example, every wheel—of the robot includes an encoder. Each encoder is configured—for example, connected, arranged, and/or programmed—to detect the number of rotations of a wheel and to report this number to the control system. In some examples, the encoders report the degrees of rotation of the wheels and the control system uses this information to determine the number of rotations. As described herein, the control system uses the number of rotations of the wheel or wheels to determine the distance that the robot has traveled. In some implementations, the odometry system also includes an accelerometer, a gyroscope, or both an accelerometer and a gyroscope. These components may be used to determine directions of travel of the robot. For example, the accelerometer may be used to determine the direction—for example, left, right, forward, or backward—of travel of the robot in a Cartesian XY dimensional plane that defines the surface over which the robot travels. For example, the gyroscope may be used to determine whether the robot has gained or lost elevation during its travel. That is, the gyroscope may be used to determine a direction of travel of the robot in the Cartesian Z dimension. Readings from the accelerometer and/or the gyroscope may be provided to the control system. The control system may use these readings, along with the readings from the encoders, to determine the distance and direction of travel of the robot. The control system may use this information to determine the location of the robot within a space being traversed. For example, the odometry system may determine the distance and direction of travel of the robot since an immediately prior localization. Accordingly, the distance and direction of travel are increments. These increments may be added to the location determined at the prior localization to determine the current location of the robot.

Figure 4:
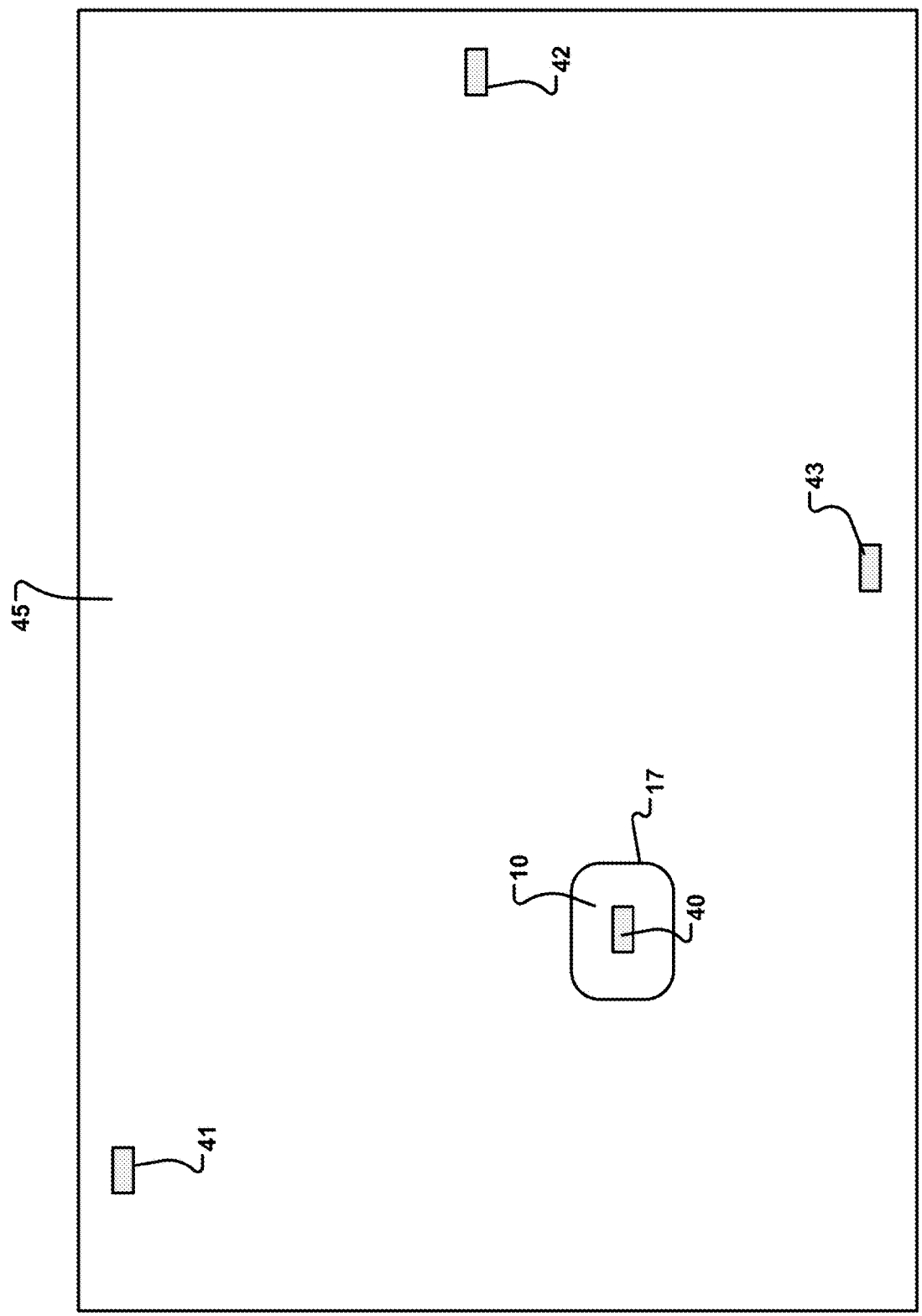
FIG. 4 is a top view of space containing the robot and containing transmitter/receiver pairs that communicate with the robot.

Robot 10 also includes a triangulation system. In some implementations, the triangulation system includes one or more transmitters on the robot, one or more transmitters located at various locations around the space to be traversed, one or more receivers located on the robot, and/or one or more receivers located at various locations around the space to be traversed. Referring to FIG. 4, in an example, the triangulation system includes a transmitter/receiver pair 40—which may be implemented as a transceiver—disposed on robot 10 itself. In this example, the triangulation system also includes three remote transmitter/receiver pairs 41, 42, and 43—which may each be implemented as a transceiver— positioned at different locations within the space 45 being traversed by the robot. Although three remote transmitter/ receiver pairs are shown in FIG. 4, any appropriate number of remote transmitter/receiver pairs may be used. For example, there may be four remote transmitter/receiver pairs, five remote transmitter/receiver pairs, six remote transmitter/receiver pairs, and so forth. In some implementations, each transmitter may be configured—for example, constructed, arranged, and/or programmed—to transmit radio frequency (RF) signals. However, other types of signals may be used, such as microwave signals or visible light signals. Each receiver may be configured—for example, constructed, arranged, and/or programmed—to receive RF signals or whatever type of signal is output by a corresponding transmitter.

The transmitter/receiver pair on the robot is referred to as the robot pair and the remote transmitter/receiver pairs dispersed around the space being traversed are referred to as the reference pairs, since each remote transmitter/receiver pair in the space acts as a fixed reference for the robot. In some implementations, a transmitter in the robot pair transmits one or more signals to each of the reference pairs. The control system records the time that each signal was transmitted to a reference pair. A receiver at each reference pair records the time that the transmitted signal arrives at the reference pair. A transmitter at each reference pair transmits, to the robot pair, a timestamp message containing this time. The control system uses the times that the signals were transmitted to the reference pair and the timestamp messages received from the various reference pairs to determine the location of the robot relative to each reference pair. That is, knowing the time that a signal was transmitted and received, and that the signal travels at the speed of light, the control system can determine the distance that the signal traveled. This distance corresponds to the distance between the robot and the reference pair associated with the signal. Since the locations of the reference pairs within the space are known beforehand, by determining the location of the robot relative to multiple—for example, three—reference pairs, the control system can also determine the location of the robot within the space. In some implementations, transceivers that use ultrasonic waves that travel at the speed of sound could be used as these may reduce requirements for time resolution in the transceiver.

In some implementations, each transmitter at the multiple reference pairs transmits a signal to the receiver at the robot pair independent of any transmissions received from the robot pair. These signals each contain a timestamp message corresponding to—for example, identifying when—the time that the signals were transmitted from each transmitter. The control system records the time that each of these timestamp messages was received at the robot. The control system uses these times and the times of transmission contained in the timestamp messages from the various reference pairs to determine the location of the robot relative to each reference pair. As explained, since the locations of the reference pairs within the space are known beforehand, the control system can determine the location of the robot relative to each reference pair. Using this information from multiple—for example, three—reference pairs, the controller can determine the location of the robot within the space. In this example, the reference pairs may transmit signals to the robot pair continuously or at predefined intervals. By contrast, in the example described in the preceding paragraph, the robot pair may initiate transmission in response to an event, such as determining that the location obtained from the vision system is unreliable. In some cases, in the example described in the preceding paragraph, the robot pair may transmit signals and receive timestamp messages at predefined intervals or continuously irrespective of any events that may or may not occur.

In some implementations, the control system determines the location of the robot within the space based on times that signals were transmitted from the robot and received at a remote location and also based on times that signals were transmitted from the remote location and received at the robot. For example, a transmitter in the robot pair transmits one or more signals to each of the reference pairs. The control system records the time that each signal was transmitted to a reference pair. A receiver at each reference pair records the time that the transmitted signal arrives at the reference pair. A transmitter at each reference pair transmits, to the robot pair, a timestamp message containing this time. The control system uses the times that the signals were transmitted to the reference pair and the timestamp messages received from the various reference pairs to determine a first location of the robot relative to each reference pair. Also, each transmitter at the multiple reference pairs transmits a signal to the receiver at the robot pair independent of any transmissions received from the robot pair. These signals contain a timestamp message corresponding to—for example, identifying when—the time that the signals were transmitted from each transmitter. The control system records the time that each of the timestamp messages was received. The control system uses these times and the times of transmission contained in the timestamp messages from the various reference pairs to determine a second location of the robot relative to each reference pair. For each reference pair, the control system may determine the location of the robot based on the first location and the second location. For example, the first and second locations may be processed— for example, through averaging, weighted averaging, or any other appropriate technique—to obtain the location of the robot within the space.

In some implementations, the triangulation system may employ a global positioning system (GPS). For example, the robot may include a GPS device containing a transceiver. The GPS device may use trilateration to identify the location of the robot in global coordinates. In an example, global coordinates include latitude and longitude coordinates. In an example, trilateration includes receiving signals from three GPS satellites, which are a type of remote device, and measuring distances of the robot from the three GPS satellites to pinpoint a location of the robot on the Earth. The GPS device may be used this information to obtain global coordinates for the robot. The control system may know the global coordinates defining the space being traversed. Since the global coordinates of the space are known beforehand, the global coordinates of the robot may be used to determine the location of the robot within that space. For example, the position of the robot in the space may be calculated by determining the distance between the current location of the robot and walls enclosing the space or other landmarks in the space having known global coordinates.

Control system 35 may include circuitry or an on-board computing system to implement localization and to control other operations of the robot. The circuitry or on-board computing system is "on-board" in the sense that it is located on the robot itself. The control system may include, for example, one or more microcontrollers, one or more microprocessors, programmable logic such as a field-programmable gate array (FPGA), one or more application-specific integrated circuits (ASICs), solid state circuitry, or any appropriate combination of two or more of these types of processing devices. In some implementations, on-board components of the control system may communicate with a remote computing system. This computing system is remote in the sense that it is not located on the robot itself. For example, commands provide by the remote computing system may be transferred for execution by an on-board computing system. In some implementations, the control system includes only on-board components. In some implementations, the control system includes a combination of on-board components and the remote computing system. In some implementations, the control system may be configured—for example programmed—to implement control functions, including localization, absent either local or remote input from a user. In some implementations, the control system may be configured to implement control functions, including localization, based at least in part on input from a user.

Figure 5:
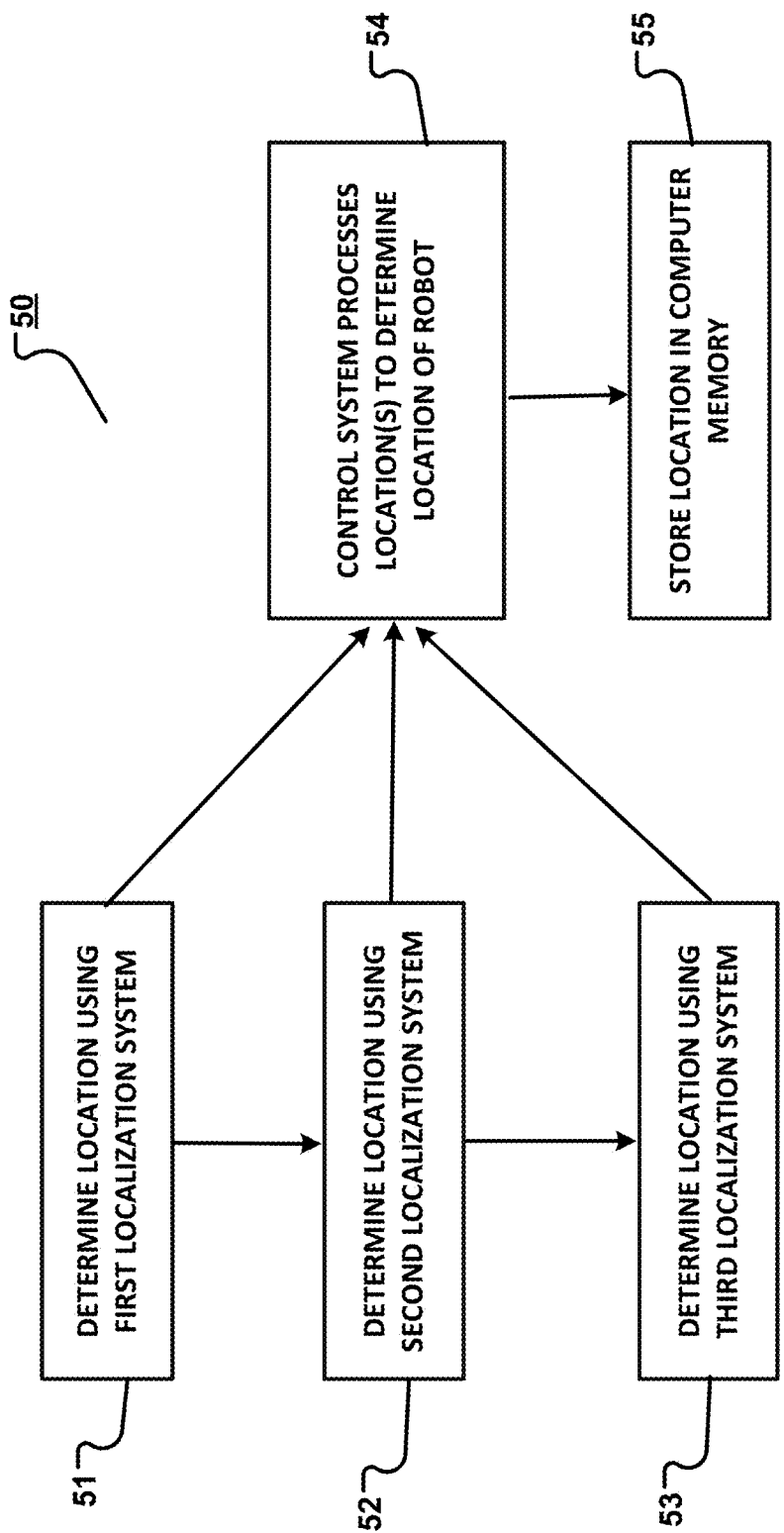
FIG. 5 is a flowchart showing operations that are part of an example process for performing localization for the robot.
Like reference numerals in different figures indicate like elements.

FIG. 5 shows operations included in an example process 50 for performing localization on an autonomous device such as the robot described with respect to FIGS. 1 to 4. Process 50 and the operations associated therewith may be performed by the control system. For example, process 50 may be performed by circuitry or an on-board computing system on the robot, by the circuitry or the on-board computing system in communication with a remote computing system, or by the remote computing system in cases where the robot is controllable remotely.

In the description of process 50, the adjectives "first", "second", and "third" do not designate priority or order. Instead, these adjectives are used solely to differentiate the three types of localization systems described herein.

According to process 50, a first localization system determines (51) a current location of the robot. In some examples, the first localization system includes the vision system described previously. As explained, the vision system operates by detecting landmarks—that is, points of reference—that are known within a space being traversed. The location determined by the vision system is processed (54). In some implementations, the reliability of location detected via the vision system is determined. For example, the control system may implement a particle filter to evaluate visual data from the vision system against data representing known references (e.g., landmarks) in the space being traversed. As explained, examples of landmarks in space may include columns, corners, windows, poles, and other distinguishable features. The data spread in the particle filter corresponds to a quality or reliability of the visual data. If all required references are recognized—for example, detected references in the space match expected references in a database containing the predefined map of the space—the spread of the particle filter is low and the reliability of the visual data is considered high. By contrast, if all or some references are not recognized—for example, not all references in the predefined map are reflected in the visual data—the spread of the particle filters is high and reliability of the visual data is considered low. In some implementations, if the reliability of the visual data, and thus the reliability of the location of the robot determined based on the visual data, meets or exceeds a predefined level of reliability, process 50 ends. Accordingly, in some examples, the predefined level of reliability is based on the spread of the particle filter. In some examples, the predefined level of reliability is based on the number of landmarks recognized by the vision system. In some implementations, where the reliability of the visual data meets or exceeds the predefined level, the location of the robot obtained using the vision system is used by the robot as its current location.

In some implementations, if the reliability of the visual data, and thus of the location of the robot determined based on the visual data, is below a predefined level of reliability, the robot may perform localization based on locations of the robot determined by one or more auxiliary localization systems. In some implementations, these operations are performed only if the reliability of the visual data is below the predefined threshold. In some implementations, the location of the robot is always determined using the one or more auxiliary localization systems, and the reliability of the location determined using the vision system is compared to the reliability of the location or locations determined using the one or more auxiliary localization systems. Whichever location is deemed to be more reliable is used as the current location of the robot. That location may be stored in memory on the robot or elsewhere along with a timestamp indicating the current time. For example, coordinates of the location may be stored in association with the time that the robot was located at those coordinates.

According to process 50, the location of the robot is determined (52) using a second localization system—in this example, the triangulation system described previously. As explained, the triangulation system uses travel times of signals transmitted between the robot and one or more remote devices to determine the location of the robot within the space being traversed. The location determined by the triangulation system is processed (54). In some implementations, the control system samples data from the triangulation system representing the current location of the robot at successive points in time referred to as localization steps. The control system also samples data from the vision system representing the current location of the robot at each localization step. The control system compares the visualization data to the triangulation data to determine which of the two is more reliable; that is, whether the location determined by the vision system or the location determined by the triangulation system is more reliable. This may be done by using a particle filter and setting mathematical limits for the particle filter. When the visualization data exceeds those limits, then the triangulation data is deemed to be more reliable and, therefore, the location determined by the triangulation system is deemed to be more reliable than the location determined by the vision system. The robot may use the location determined by the triangulation system as its current location. Alternatively, the robot may use the location determined by the triangulation system in combination with a location of the robot obtained from another auxiliary localization system.

In this regard, according to process 50, the location of the robot is also determined (53) using a third localization system—in this example, the odometry system described previously. The location determined by the triangulation system is processed (54). In this regard, the odometry system determines a location of the robot relative to one or more prior locations of the robot stored in memory on the robot or elsewhere such as in a remote computing system. For example, the odometry system may determine how far the robot has moved since a prior localization based on the number or rotations of its wheels and/or the degrees of wheel rotation. For example, the odometry system may determine the direction that the robot has moved based on readings from an accelerometer and/or a gyroscope on the robot. The distance moved and the direction of movement may be since the location determined during an immediately prior localization. The location of the robot at the immediately prior localization may have been determined by the odometry system, the triangulation system, the vision system, or some combination thereof. In any event, that location is stored in the form of coordinates in computer memory on the robot or elsewhere. The control system updates the location of the robot based on the distance traveled and the direction traveled since the location at the prior localization step, which are obtained from the odometry system. This updated location of the robot is stored and is used to obtain the current location of the robot. In some implementations, the location of the robot is always determined using the odometry system and that location is corrected using data from the vision system or the data from the triangulation system when that data is reliable.

In this regard, in some implementations, the reliability of the location determined by the triangulation system and the reliability of the location determined by the vision system may be determined based on the location of the robot determined using the odometry system. For example, if the location determined using the odometry system is closer to the location determined by the vision system than to the location determined by the triangulation system, then the location determined by the vision system is deemed to be more reliable than the location determined by the triangulation system. For example, if the location determined using the odometry system is closer to the location determined by the triangulation system than to the location by the vision system, then the location determined by the triangulation system is deemed to be more reliable than the location determined by the vision system. In this example, whichever location is deemed more reliable is used as the current location of the robot. That location may be stored in memory on the robot or elsewhere along with a timestamp indicating the current time. For example, coordinates of the location may be stored.

In some implementations, the location determined by the odometry system and the location determined by the triangulation system are processed (54) to determine an estimated location of the robot. This estimated location may be used as the current location of the robot, for example when the location of the robot determined by the vision system is deemed not to be sufficiently reliable. As explained, in an example, the location of the robot determined by the vision system may be deemed unreliable if the location does not meet or exceed a predefined level of reliability.

In some implementations, process 50 determines whether the location determined by the triangulation system or the location determined by the vision system is the more reliable location in a manner described herein. Whichever location is deemed more reliable is selected. The selected location from the vision system or the triangulation system is combined with the location determined by the odometry system to determine the estimated location of the robot. This estimated location may be used as the current location of the robot in lieu of the location determined solely by the vision system, the location determined solely by the triangulation system, or the location determined solely by the odometry system. Accordingly, while the following describes determining the estimated location using the location determined by the triangulation system and the location determined by the odometry system, any processing to determine the estimated location described herein may alternatively use the location determined by the vision system and the location determined by the odometry system.

In some implementations, the estimated location includes an average of the location determined by the odometry system and the location determined by the triangulation system. For example, coordinates for each of the location determined by the odometry system and the location determined by the triangulation system may be averaged to produce coordinates for the estimated location. In an example, each time the triangulation data is selected for use instead of the visual data, the locations of the robot obtained from the triangulation system and the odometry system are averaged. In this regard, data from the odometry system represents an incremental move from a last defined localization and data from the triangulation system represents an absolute localization. Accordingly, to implement the average, the data from the odometry system may be combined with stored data representing the prior localization and that combination may represent the location of the robot determined by the odometry system. It is this location that may be averaged with the location of the robot determined by the triangulation system.

In some implementations, the estimated location includes a weighted average of the location determined by the odometry system and the location determined by the triangulation system. For example, coordinates for one or both of the location determined using the odometry system and the location determined using the triangulation system may be weighted. The resulting weighted coordinates may be combined to produce coordinates for the estimated location.

The following equations may be used to determine the estimated location using a simple average or a weighted average of the location determined by the odometry system and the location determined by the triangulation system.

$Tra(T)$=triangulation data at time instant $T$ $Odo(T)$=odometry data at time instant $T$ $Loc(T)$=localization at time instant $T$ $Loc(T)=w1 \times Tra(T)+w2 \times Odo(T)$, where $w1$, $w2$ are weights.

$Odo(T)=Loc(T-1)+Odo(incremental)$ $w1$, $w2$ can be assigned based on reliabilities of the triangulation data and the odometry data; in general, a larger weight is assigned to more reliable data.

In a simple average, $w1=w2=½$ (a constant)

In some implementations, the estimated location of the autonomous device is obtained by processing locations determined by the odometry system and the triangulation system using a finite impulse response (FIR) filter. In signal processing, a finite impulse response (FIR) filter is a filter having an impulse response or response to any finite length input that is of finite duration because the response settles to zero in finite time. In some implementations, the data from the triangulation system is sampled at a higher frequency than the data from the odometry is sampled. An FIR filter is used to improve the reliability of the triangulation data before using simple averaging to obtain a best fit for the triangulation data and the odometry data.

The following equations may be used to determine the estimated location using an FIR filter and using the locations of the robot determined by the odometry system and the triangulation system.

Use an FIR filter to smooth triangulation time series data:

Tra(T)=a1×Tra(T−1)+a2×Tra(T−2)+ . . . an× Tra(T−n).

Then, obtain localization based on a simple or weighted average of FIR-filter-processed triangulation data and odometry data Loc(T)=w1×Tra(T)+w2×Odo(T), where w1, w2 are weights.

Odo(T)=Loc(T−1)+Odo(incremental)

In a simple average, w1=w2=½

A variant of processing of using an FIR filter to obtain the estimated location includes increasing the frequency at which the odometry data is sampled and saving historical data from the odometry system—for example, save every three to five steps of most recent historical data. Then, an FIR filter is used to make a best prediction based on localization data from both the odometry system and the triangulation system. The following equations may be used to determine the estimated location according to this variant.

Train(T), Train(T−1), Train(T−2), Train(T−3),—use 3 steps in this example.

Odo(T), Odo(T−1), Odo(T−2), Odo(T−3)

A general FIR filter is:

Y(T)=a1×X(T−1)+a2×X(T−2)+a3×X(T−3),—stop at T−3 in this example.

Tra(T)=a1×Tra(T−1)+a2×Tra(T−2)+Tra(T−3)

Odo(T)=b1×Odo(T−1)+b2×Odo(T−2)+b3×Odo(T−3)

Loc(T)=W1×Tra(T)+W2×Odo(T)

In this example, odometry is an incremental move from last localization whereas the triangulation is an absolute localization.

In some implementations, the estimated location of the autonomous device is obtained by processing locations determined by the odometry system and the triangulation system using a Kalman filter that uses odometry data as an input for weighting. A Kalman filter includes mathematical equations that provide a computational (recursive) method of estimating the state of a process in a way that minimizes a mean of a squared error. In this example, data from the triangulation system is processed continuously using a Kalman filter and odometry data (e.g., a last defined localization) and an incremental move from the last defined localization) is used as input to weight the data in the Kalman filter. An example Kalman filter for a scalar time series can be represented as follows, assuming an AR(1) state model:

$$K(n) \overset{def}{=} \frac{\phi c E[e_n^2]}{\sigma_V^2 + c^2 E[e_n^2]}.$$

$$E[e_{n-1}^2] = [\phi - K(n)c]^2 E[e_n^2] + \sigma^2 + K^2(n)\sigma_V^2,$$

and $$\hat{X}_{n-1} = K(n)[Y_n - c\hat{X}_n] + \phi\hat{X}_n.$$

In the above equation, K(n) is the gain. The last localization plus an incremental move represented by the odometry data is used as the predicted state estimate $_q\hat{x}_n$. Here, $c\hat{X}_n$ is the odometry data Odo(n), Yn is the triangulation data, and K(n) is the weight rule to apply between the triangulation data and the odometry data.

In some implementations, data from the vision system is processed continuously using a Kalman filter and a combination of odometry data and triangulation data is used as input to weight the data in the Kalman filter. This version may be used, for example, when visual data is available but a spread of the visual data is greater than desired, leading to a determination that the location based on the visual data is unreliable or at least of questionable reliability. In this example, $_q\hat{x}_n$ is the predicted state estimate from a last localization and odometry increment and $c\hat{X}_n$ corresponds to locations on a map of visual data from a new expected robot position. Yn is the visual sensor data and K(n) is the weight rule defined based on triangulation data.

A Kalman filter is used to determine the estimated location in the preceding examples. However, other types of mathematical models for liner or nonlinear systems having Gaussian or non-Gaussian noise can be used instead of a Kalman filter. For example, a particle filter can be used in place of a Kalman filter.

In some implementations, the estimated location is determined based on an average of the locations determined by the odometry system and the triangulation system, except that an expected localization is determined from prior historical data and intended movement of the robot. This information is used for assigning a weighting to the odometry data and triangulation data. The following equations may be used to determine the estimated location according to this variant.

Loc(T)=w1×Tra(T)+w2×Odo(T)

where w1 and w2 are dynamic weight factors based on historical data, for example:

w1=a1×(Loc(T−1)−Tra(T−1))+a2×(Loc(T−2)−Tra(T−2))+a3×(Loc(T−3)−Tra(T−3))+an×(Loc(T−n)−Tra(T−n))

w2=a1×(Loc(T−1)−Odo(T−1))+a2×(Loc(T−2)−Odo(T−2))+a3×(Loc(T−3)−Odo(T−3))+an×(Loc(T−n)−Odo(T−n))

In some implementations, the control system is configured to calibrate the triangulation system based on a location determined by the vision system, to determine a reliability of the location determined by the vision system, and to control movement of the autonomous device using a location determined by the triangulation system in a case that the location determined by the vision system has less than a predefined level of reliability. Examples of determining the reliability of the location determined by the vision system are described previously. In some implementations, a greatest error in the triangulation data is a constant offset and hence the visual data, when its spread (Yn−$c\hat{X}_n$) is below a predefined level, can be used to determine the offset of the triangulation system and thereby calibrate the triangulation system to the visual system. For example, the offset can be added to or subtracted from locations determined by the triangulation system. Thereafter, the triangulation data, which should have increased accuracy, can be used to determine the location of the robot when the location of determined by the visual data is deemed to be unreliable. The location of the robot determined using the triangulation data and the location of the robot determined using the odometry data may be processed as described herein to further refine the current location of the robot within the space being traversed.

Referring back to FIG. 5, the location of the robot determined by the control system may be stored (55) in computer memory. The location may be used to determine future movements of the robot. For example, the location may be the point on which future movements are based.

The example robot described herein may include, and the processes described herein may be implemented using, a control system comprised of one or more computer systems comprising hardware or a combination of hardware and software. For example, a robot may include various controllers and/or processing devices located at various points in the system to control operation of its elements. A central computer may coordinate operation among the various controllers or processing devices. The central computer, controllers, and processing devices may execute various software routines to effect control and coordination of the various automated elements.

The example robot described herein can be controlled, at least in part, using one or more computer program products, e.g., one or more computer program tangibly embodied in one or more information carriers, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing at least part of the robot can be performed by one or more programmable processors executing one or more computer programs to perform the functions described herein. At least part of the robot can be implemented using special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. An autonomous device configured to move within a space, the autonomous device comprising:
    a first system to detect a first location of the autonomous device within the space, the first location being based on a first fixed reference;
    a second system to detect a second location of the autonomous device within the space, the second location being based on a second fixed reference;
    a third system to detect a third location of the autonomous device within the space based on relative movements of the autonomous device; and
    one or more processing devices to select one of the first location or the second location that is closer to the third location, and to control movement of the autonomous device using an estimated location that is based on the third location and the selected one of the first location or the second location and that is determined through one or more calculations that involve the third location and the selected one of the first location or the second location;
    wherein the second system comprises:
        a transmitter for transmitting signals; and
        a receiver for receiving timestamp messages based on the signals;
        wherein the one or more processing devices are configured to determine the second location based on a transmitted signal and a timestamp message corresponding to the transmitted signal, the timestamp message containing a time that the transmitted signal was received by a remote receiver, the second fixed reference comprising the remote receiver.

2. The autonomous device of claim 1, wherein the one or more processing devices are configured to determine a reliability of at least one of the first location or the second location by setting mathematical limits of a particle filter, and to determine if visualization data upon which the first location is based exceeds the mathematical limits of the particle filter.

3. The autonomous device of claim 1, wherein the first system comprises a vision system configured to detect landmarks within the space that are within a predefined distance of the autonomous device, the landmarks comprising the first fixed reference.

4. The autonomous device of claim 1, wherein the first system comprises a laser-based vision system.

5. The autonomous device of claim 1, wherein the one or more processing devices are configured to obtain the estimated location by averaging the second location and the third location.

6. The autonomous device of claim 1, wherein the one or more processing devices are configured to obtain the estimated location by obtaining a weighted average of the second location and the third location.

7. The autonomous device of claim 1, wherein the one or more processing devices are configured to obtain the estimated location based also on one or more prior estimated locations of the autonomous device.

8. The autonomous device of claim 1, wherein the estimated location of the autonomous device is obtained by processing the second location and the third location using a finite impulse response filter.

9. The autonomous device of claim 1, wherein the estimated location of the autonomous device is obtained by processing the second location and the third location using a Kalman filter or a particle filter.

10. The autonomous device of claim 1, wherein the one or more processing devices are configured to determine the estimated location of the autonomous device based on both of the second location and the third location.

11. The autonomous device of claim 1, wherein the one or more processing devices are configured to determine a reliability of at least one of the first location or the second location by comparing the first location and the second location to the third location.

12. The autonomous device of claim 11, wherein the first system comprises a light detection and ranging (LIDAR) system.

13. The autonomous device of claim 1, further comprising:
a body; and
wheels to move the body;
wherein the third system comprises an odometry system, the odometry system being configured to determine the third location based on movements of the wheels, the relative movements of the autonomous device being based on the movements of the wheels.

14. The autonomous device of claim 13, wherein the odometry system comprises encoders connected to the wheels, the encoders providing information about rotation of the wheels.

15. The autonomous device of claim 13, wherein the information about rotation of the wheels comprises degrees of rotation of the wheels.

16. The autonomous device of claim 1, wherein the one or more processing devices are configured to perform operations comprising:
determining a level of reliability of the first location; and
comparing the determined level of reliability to a predefined level of reliability to identify that the first location has less than the predefined level of reliability;
wherein determining the level of reliability of the first location comprises using a filter to compare visual data based on the first fixed reference to known features in a database.

17. The autonomous device of claim 16, wherein the one or more processing devices are configured to determine the level of reliability of the first location using a particle filter.

18. An autonomous device configured to move within a space, the autonomous device comprising:
a first system to detect a first location of the autonomous device within the space, the first location being based on a first fixed reference;
a second system to detect a second location of the autonomous device within the space, the second location being based on a second fixed reference;
a third system to detect a third location of the autonomous device within the space based on relative movements of the autonomous device; and
one or more processing devices to select one of the first location or the second location that is closer to the third location, and to control movement of the autonomous device using an estimated location that is based on the third location and the selected one of the first location or the second location and that is determined through one or more calculations that involve the third location and the selected one of the first location or the second location;
wherein the second system comprises:
a transmitter for transmitting signals; and
a receiver for receiving timestamp messages and signals;
wherein the one or more processing devices are configured to determine the second location based on a transmitted signal and a timestamp message corresponding to the transmitted signal, the timestamp message containing a time that the transmitted signal was received by a remote receiver, the second fixed reference comprising the remote receiver; and
wherein the one or more processing devices are configured to determine the second location based also on a received signal and a timestamp message corresponding to the received signal, the timestamp message containing a time that the received signal was transmitted by the remote receiver.

19. The autonomous device of claim 18, wherein the first system comprises a vision system configured to detect landmarks within the space that are within a predefined distance of the autonomous device, the landmarks comprising the first fixed reference.

20. The autonomous device of claim 18, further comprising:
a body; and
wheels to move the body;
wherein the third system comprises an odometry system, the odometry system being configured to determine the third location based on movements of the wheels, the relative movements of the autonomous device being based on the movements of the wheels.

21. The autonomous device of claim 18, wherein the estimated location of the autonomous device is obtained by processing the second location and the third location using a finite impulse response filter.

22. An autonomous device configured to move within a space, the autonomous device comprising:
a first system to detect a first location of the autonomous device within the space, the first location being based on a first fixed reference;
a second system to detect a second location of the autonomous device within the space, the second location being based on a second fixed reference;
a third system to detect a third location of the autonomous device within the space based on relative movements of the autonomous device; and
one or more processing devices to determine an estimated location of the autonomous device within the space through one or more calculations that involve the second location and the third location, the estimated location being based on the second location and the third location, and to control movement of the autonomous device using the estimated location in a case that the estimated location is closer to the third location than the first location is to the third location;
wherein the second system comprises:
a transmitter for transmitting signals; and
a receiver for receiving timestamp messages based on the signals;

wherein the one or more processing devices are configured to determine the second location based on a transmitted signal and a timestamp message corresponding to the transmitted signal, the timestamp message containing a time that the transmitted signal was received by a remote receiver, the second fixed reference comprising the remote receiver.

23. The autonomous device of claim 22, wherein the one or more processing devices are configured to determine the estimated location of the autonomous device based on both of the second location and the third location.

24. An autonomous device configured to move within a space, the autonomous device comprising:
- a first system comprising a vision system that uses machine vision to detect a first location of the autonomous device within the space, the first location being based on a first fixed reference;
- a second system comprising a triangulation system that uses triangulation to detect a second location of the autonomous device within the space, the second location being based on a second fixed reference, the triangulation system having an offset from the vision system; and
- one or more processing devices to perform calibration of the second system to the first system by adding the offset to, or subtracting the offset from, the second location to produce a calibrated second location, to determine a reliability of the first location, and to control movement of the autonomous device using the calibrated second location in a case that the first location has less than a predefined level of reliability.

25. The autonomous device of claim 24, further comprising:
- a third system to detect a third location of the autonomous device within the space based on relative movements of the autonomous device.

* * * * *